Patented Feb. 8, 1927.

1,616,910

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

CELLULOSE COMPOSITION AND PROCESS.

No Drawing. Application filed April 25, 1922. Serial No. 556,532.

This invention relates to a process for rendering certain inflammable materials, substance, or compounds, non-inflammable, and to the preparation of commercially useful non-inflammable articles, such as paper, textile fabrics, cellulose plastics, pyroxylin plastics and the like.

The degree of non-inflammability sought for is that which will not permit of a self sustaining combustion, after the application of a flame at ordinary or normal temperature. This degree of non-inflammability will however, be varied according to desired conditions.

I have discovered that inflammable materials which permit of a self sustaining combustion by the application of a flame at ordinary or normal temperature may be prevented from burning under ordinary conditions and rendered non-inflammable provided there is present in suitable combination a heat absorbing compound capable of absorbing or taking up through decomposition, volatilization, or other change, all or the major part of the heat that would be necessary to raise the material or its components to the point at which ignition could be sustained.

This heat absorbing, or endothermic, substance or compound should be of such nature that it will decompose or otherwise be in condition to absorb heat before or when the temperature of combustion of the material to be rendered non-inflammable has been reached. The absorption of heat will thus proceed at such a rate as to prevent the combustible material from attaining its temperature of ignition. The endothermic substance or compound will also be selected having in view other characteristics besides its heat absorbing capacity on decomposition in that it may be desired to impart other properties to the resultant product. The relative proportions of the combustible substance, i. e., the substance to be rendered non-inflammable, and endothermic or heat absorbing substance, will be varied somewhat to meet conditions of strength, plasticity, transparency, or other desirable characteristics, but in general will be dependent upon the amount of decomposition, in heat unit equivalents, that can take place at or below the temperature at which combustion could be sutained by the exothermic compound if the heat of combustion were not absorbed at a greater rate than at which it could be liberated. The general rule is that a sufficient quantity of endothermic substance should be employed to absorb upon its decomposition a sufficient amount of heat to prevent a sustained combustion of the said exothermic subtance.

In carrying out my invention, any one of a number of products may be the aim. The characteristics of these products may vary from that of a hard, nonmoldable, dense solid sheet material which may be used for cutting out various objects such as brush backs, mirror backs, knife handle, etc., to that of a thin, highly flexible product which may be used for the veneering of fabrics, paper and the like or which can be used in place of various textiles and other flexible materials. The flexible compound may also be used as a substitute for leather. It may also possess the necessary characteristics required in compounds that are to be molded such as molded boxes, molded handles, molded brushes, mirrors, etc.

In carrying out the invention the procedure will vary according to the nature and physical properties of the material treated. The exothermic substance which I propose to use will be nitrocellulose, acetylcellulose, or some cellulosic ester, ether, derivative, or compound.

In the following examples I give such proportions as will be applicable to compounds containing nitrocellulose, as this is the most inflammable of the cellulose derivatives and any substance that may be incorporated with the nitrate for the purpose of reducing, limiting or preventing combustion will be effective with other compounds of cellulose, and as a matter of fact, with cellulose itself.

The permanent or nonvolatile solvents, generally referred to as the plasticizing agents and which are to be combined with the pyroxylin or other cellulose derivative for the purpose of bringing about the necessary conversion, etc. in the course of manufacture, should be of such nature that the point of ignition is relatively high. In my experiments I have found that the organic phosphates posses the necessary characteristics of solubility and at the same time possess the requisite temperature of ignition. The most satisfactory results are produced with the aromatic phosphates because of their relatively high stability and resistance to decomposition, and because they possess at the same time the necessary solvent or plasticizing effect on the nitrocellulose, as well as a relatively high ignition point.

To a mixture of nitrocellulose and an aromatic phosphate, as for example, liquid tricresylphosphate, I add a sufficient amount of lithium phosphate to prevent the combined mixture from sustaining ignition upon the application and withdrawal of a flame. An example of proportions for this purpose is 100 parts of pyroxylin, 75 parts of liquid tricresylphosphate, and 125 parts of lithium phosphate ($Li_3PO_4.H_2O$.) Material of this composition, when manufactured according to the usual methods as obtain in the pyroxylin plastic industry, will possess hardness, toughness and moldability in similar degree to the usual varieties of celluloid, manufactured in the form of ivory, opaque colors and the like.

In the manufacture of these non-inflammable compounds I proceed substantially as in the manufacture of ordinary pyroxylin plastic materials incorporating the lithium phosphate compound with the soaked or colloidized mass of pyroxylin and liquid tricresylphosphate prior to final mastication on the rolls. This incorporation may be effected in kneaders or the lithium phosphate compound may be directly added during the course of mastication on the rolls. The lithium phosphate compounds may also be incorporated with the pyroxylin in the same operation in which the liquid tricresylphosphate is incorporated, the method for which is described in my U. S. Patent No. 1,233,374, granted July 17, 1917.

In the choice of liquid volatile solvent, I may select any one or a combination of a number of the common ordinary solvents, such as methyl alcohol, ethyl alcohol, acetic ether, acetone, amyl acetate, or the various commercial grades and mixtures of these compounds as are ordinarily found upon the market.

In the manufacture of the flexible non-inflammable compound having the properties of leather and the like, I proceed as in the example specified but instead of employing 75 parts of liquid tricresylphosphate, I increase the amount to 200 parts to 100 parts pyroxylin. Material of this composition may be worked up according to the usual method for the manufacture of pyroxylin plastic compounds and produced in the form of sheets by shaving from a block, or it may be dissolved in a suitable proportion of solvent such as wool alcohol, acetone and the like and spread upon a suitable surface such as a textile fabric, leather and the like.

I claim:

1. A composition comprising a homogeneous non-fibrous cellulosic derivative and a fire-retarding ingredient comprising lithium phosphate containing water of crystallization, said fire retarding ingredient being present in sufficient amount to render the composition non-inflammable.

2. A composition containing a cellulose ester, an aromatic phosphate and in close association therewith lithium phosphate in sufficient amount to render the composition non-inflammable.

3. A composition containing a cellulose ester, an aromatic phosphate and in close association therewith lithium phosphate containing water of crystallization said lithium phosphate being present in sufficient amount to render the composition non-inflammable.

4. A composition containing a cellulose ester and sufficient fire-retarding agent comprising lithium phosphate to render the composition non-inflammable.

5. A homogeneous composition containing a cellulose ester and tricresylphosphate in admixture with lithium phosphate in sufficient amount to render the composition non-inflammable.

6. A composition containing plasticized pyroxylin and lithium phosphate in sufficient amount to render the composition non-inflammable.

7. A composition comprising plasticized pyroxylin and lithium phosphate containing water of crystallization, said lithium phosphate being present in sufficient amount to render the composition non-inflammable.

8. The process of making a non-inflammable material which consists in mixing a cellulose derivative with an aromatic phosphate in the presence of a solvent common to both and incorporating into the mixture lithium phosphate in sufficient amount to render the composition non-inflammable.

9. A composition containing pyroxylin, an aromatic phosphate, and lithium phosphate in sufficient amount to render the composition non-inflammable.

10. A composition containing pyroxylin, an aromatic phosphate and lithium phosphate containing water of crystallization said lithium phosphate being present in sufficient amount to render the composition non-inflammable.

11. A homogeneous composition containing pyroxylin, tricresylphosphate and lithium phosphate in sufficient amount to render the composition non-inflammable.

12. The process of forming a homogeneous composition of reduced inflammability which consists in mixing liquid tricresylphosphate and lithium phosphate with hydrous pyroxylin said lithium phosphate being present in sufficient amount to render the composition non-inflammable.

13. The process which consists in mixing liquid tricresylphosphate and lithium phosphate with hydrous pyroxylin, and manipulating the mixture in the presence of a volatile solvent, said lithium phosphate being present in sufficient amount to render the composition non-inflammable.

14. A homogeneous tough non-inflammable cellulose derivative composition containing a fire-retarding agent in excess of 25 per cent of said composition, said fire-retarding agent comprising lithium phosphate.

15. A composition having substantially the physical properties of the usual pyroxylin plastics and comprising a combustible organic ingredient and a fire-retarding ingredient, said latter ingredient consisting of lithium phosphate in sufficient amount to render the composition non-inflammable.

16. A tough fireproof cellulose derivative composition containing lithium phosphate in excess of 25 per cent of said composition.

17. A cellulose derivative composition having substantially the physical properties of the usual pyroxylin plastics and containing in excess of 25 per cent of lithium phosphate.

WILLIAM G. LINDSAY.

lating the mixture in the presence of a volatile solvent, said lithium phosphate being present in sufficient amount to render the composition non-inflammable.

14. A homogeneous tough non-inflammable cellulose derivative composition containing a fire-retarding agent in excess of 25 per cent of said composition, said fire-retarding agent comprising lithium phosphate.

15. A composition having substantially the physical properties of the usual pyroxylin plastics and comprising a combustible organic ingredient and a fire-retarding ingredient, said latter ingredient consisting of lithium phosphate in sufficient amount to render the composition non-inflammable.

16. A tough fireproof cellulose derivative composition containing lithium phosphate in excess of 25 per cent of said composition.

17. A cellulose derivative composition having substantially the physical properties of the usual pyroxylin plastics and containing in excess of 25 per cent of lithium phosphate.

WILLIAM G. LINDSAY.

---

Certificate of Correction.

Patent No. 1,616,910.               Granted February 8, 1927, to

WILLIAM G. LINDSAY.

It is hereby certified that error appears in the printed specification of the above-mentioned patent requiring correction as follows: Page 1, line 105, for the misspelled word " posses " read *possess;* page 2, line 59, for the word " wool " read *wood;* and that the said Letters Patent should be read with this correction therein that the same may conform to the record of the case in the Patent Office.

Signed and sealed this 15th day of March, A. D. 1927.

[SEAL.]
                           M. J. MOORE,
                           *Acting Commissioner of Patents.* ificate of Correction.

Patent No. 1,616,910. Granted February 8, 1927, to

WILLIAM G. LINDSAY.

It is hereby certified that error appears in the printed specification of the above-mentioned patent requiring correction as follows: Page 1, line 105, for the misspelled word " posses " read *possess;* page 2, line 59, for the word " wool " read *wood;* and that the said Letters Patent should be read with this correction therein that the same may conform to the record of the case in the Patent Office.

Signed and sealed this 15th day of March, A. D. 1927.

[SEAL.]

M. J. MOORE,
*Acting Commissioner of Patents.*